A. BRAGER AND O. LEE.
SKEE BRAKE.
APPLICATION FILED JULY 14, 1919.
1,345,988.
Patented July 6, 1920.
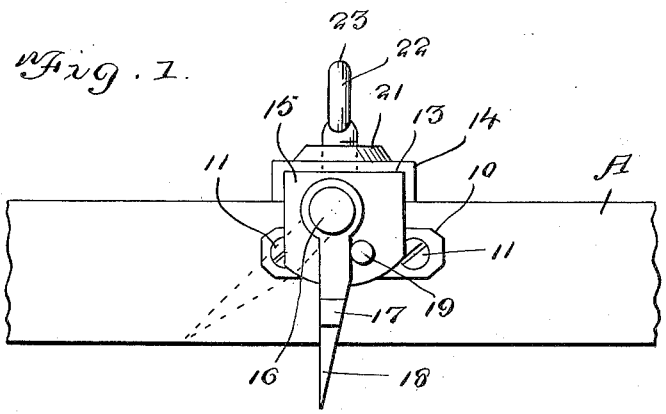
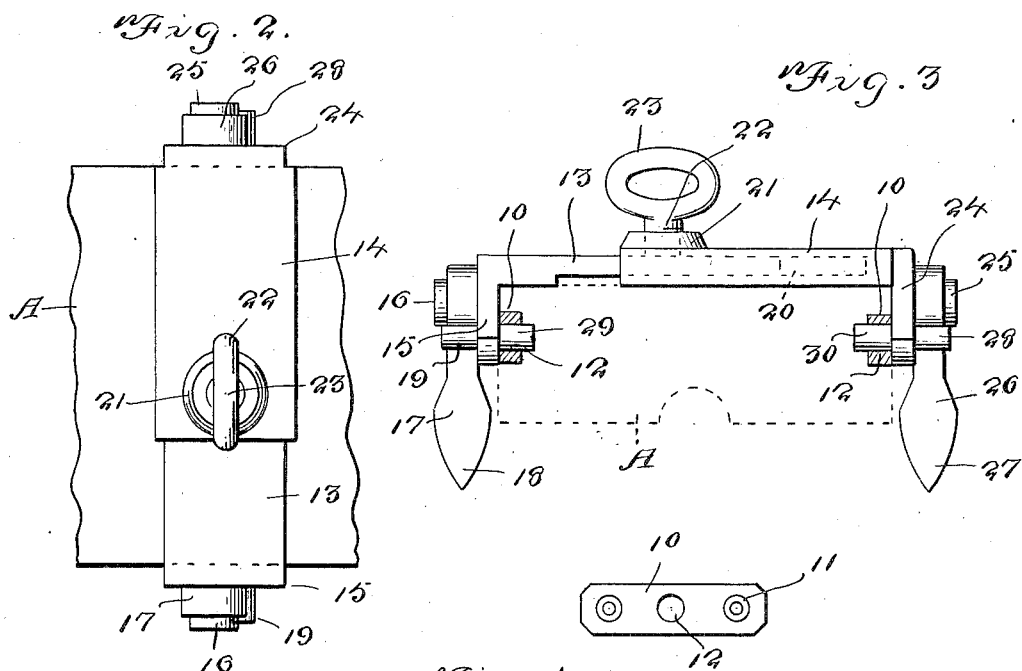
WITNESS:
E. R. Ruppert
A. Brager
O. Lee
INVENTOR.
BY
Victor J. Evans
ATTORNEY.

UNITED STATES PATENT OFFICE.

ARVID BRAGER AND OSCAR LEE, OF KINOSEE, ALBERTA, CANADA.

SKEE-BRAKE.

1,345,988.  Specification of Letters Patent.  Patented July 6, 1920.

Application filed July 14, 1919. Serial No. 310,532.

*To all whom it may concern:*

Be it known that we, ARVID BRAGER and OSCAR LEE, citizens of Norway, residing at Kinosee, in the Province of Alberta and Dominion of Canada, have invented new and useful Improvements in Skee-Brakes, of which the following is a specification.

This invention relates to skees and has for its object the provision of a brake mechanism adapted to be attached to skees whereby the skees may have unimpeded forward movement but whereby any backward sliding, as when walking upon hard crusted snow or ascending hills, will be prevented.

An important object is the provision of a device of this character which is adjustable for use upon skees of different widths, means being provided for securing the brake in such adjusted position.

A further object is the provision of a device of this character which will be very simple and inexpensive in manufacture, which may be readily attached to existing skees, which will absolutely not interfere with forward movement, which will be effective in its braking action upon attempted backward movement of the skees, and which will be a distinct improvement in the art.

With the above and other objects and advantages in view, the invention consists in the details of construction to be hereinafter more fully described and claimed, and illustrated in the accompanying drawing, in which—

Figure 1 is a side elevation of a skee showing our device applied thereto, the normal position of the brake members being shown in dotted lines and the braking position being shown by dotted lines, Fig. 2 is a plan view, Fig. 3 is a cross sectional view, and Fig. 4 is a detail elevation of one of the brake member supporting plates.

Referring more particularly to the drawing, the letter A designates a skee which is of ordinary construction. In carrying out our invention, we provide upon each side of the skee a plate 10 which may be recessed into the side of the skee, or not, as desired, and which is secured in position by suitable screws 11. Each plate 10 is provided with a bearing hole 12. These plates are attached to the skee a few inches in advance of the toe straps as being the most advantageous location.

The brake mechanism comprises a pair of members 13 and 14 which extend across the top of the skee and the former of which is formed as a bar rectangular in cross section and provided with a downwardly extending ear 15 upon which is journaled, as at 16, a freely revoluble arm 17 terminating in a penetrating point 18. The ear 15 further carries a stud or lug 19 engageable by the arm 17 for limiting movement of the arm in one direction. The member 14 instead of being formed as a bar like the member 13 is formed slightly larger and is provided with a rectangular socket 20 slidably receiving the bar 13. The member 14 is provided with a boss 21 into which is threaded a set screw 22 provided with a large finger engaging head 23 whereby the set screw may be easily rotated. This set screw provides means whereby the bar 13 may be held in telescopically adjusted position with respect to the member 14 for adjusting the brake mechanism for use upon skees of different widths. The member 14 is provided with a downwardly extending ear 24 similar to the ear 15 and upon which is journaled, as shown at 25, a brake arm 26 terminating in a penetrating point 27 and engageable against a stop lug 28 for limiting movement in one direction. It will be understood that the construction of both sides of the device is identically the same with the exception of the means for permitting adjusting of the two members. Upon the inner faces of the ears 15 and 24 are lugs 29 and 30, respectively, which are identically the same and which are engaged within the holes 12 in the plates 10 for securing the device upon the skees.

In the application of the device the set screw 22 is loosened so that the members 13 and 14 may be relatively moved, after which the lugs 29 and 30 are engaged within the holes 12 in the plates 11 after which the set screw 22 is tightened to hold the members 13 and 14 against separation. The device will thus be firmly held upon the skee.

In the operation of the device it will be seen that as the stop lugs 19 and 29 are toward the front of the skee the brake arms 17 and 26 may move rearwardly freely so that when the skee is traveling in a forward direction the brake arms will swing rearwardly and will have their points trailing along the surface in inoperative position. In the event of any tendency of the skee to slip back, as in walking upon a hard frozen crust or in ascending a hill, the penetrating points 18 and 27 of the brake arms will engage against and penetrate the surface whereupon slight rearward movement of the skee will cause the brake arms to swing against the stops 19 and 28. As the brake members will then be in fully penetrating engagement with the surface, further rearward movement of the skee will be prevented.

From the foregoing description and a study of the drawing it will be apparent that we have thus provided a very simple device which may be readily engaged upon a skee and which will serve as an effective brake for preventing rearward movement of the skee while not in any way interfering with forward movement thereof.

While we have shown and described the preferred embodiment of our invention, it is of course to be understood that we reserve the right to make such changes in the form, construction, and arrangement of parts as will not depart from the spirit of the invention or the scope of the subjoined claims.

Having thus described our invention, we claim:—

1. A brake mechanism for skees comprising a pair of telescopically engaged members extending transversely of the skee, a brake arm pivoted upon each of said members and adapted to extend beyond the lower surface of the skee, said arms being freely movable in one direction, and means for limiting movement of said arms in the other direction.

2. A brake mechanism for skees comprising a pair of telescopically adjustably connected members extending transversely of the skee, depending ears formed on the outer ends of said members, brake arms pivoted upon said ears and adapted to extend beyond the lower surface of the skee, and stop members extending outwardly from said ears and engageable by said arms for limiting movement thereof in one direction.

3. A brake mechanism for skees comprising a pair of apertured plates secured upon opposite sides of a skee, a pair of members telescopically adjustably connected and extending transversely of the skee above the top thereof, depending ears formed on the outer ends of said members, inwardly extending lugs formed on the inner faces of said ears and engaging within apertures in said plates, brake arms pivoted upon said ears and adapted to extend beyond the lower surface of the skee, and stop members extending outwardly from said ears and engageable by said arms for limiting movement thereof in one direction.

In testimony whereof we affix our signatures.

ARVID BRAGER.
OSCAR LEE.